US007039994B2

(12) United States Patent
Crawford

(10) Patent No.: US 7,039,994 B2
(45) Date of Patent: May 9, 2006

(54) MILL ROD PULLER

(75) Inventor: Patrick Crawford, Middleton, ID (US)

(73) Assignee: Diamond z Manufacturing, Caldwell, ID (US)

( * ) Notice: Subject to any disclaimer, the term of this patent is extended or adjusted under 35 U.S.C. 154(b) by 0 days.

(21) Appl. No.: 10/367,011

(22) Filed: Feb. 14, 2003

(65) Prior Publication Data

US 2004/0158963 A1 Aug. 19, 2004

(51) Int. Cl.
*B23P 19/04* (2006.01)

(52) U.S. Cl. ........................................................ 29/252

(58) Field of Classification Search .................. 29/252, 29/237, 239, 427; 254/29 R, 30, 31
See application file for complete search history.

(56) References Cited

U.S. PATENT DOCUMENTS 2,507,003 A * 5/1950 Gagne ......................... 29/252

* cited by examiner

*Primary Examiner*—Robert C. Watson
(74) *Attorney, Agent, or Firm*—Robert L. Shaver; Dykas, Shaver & Nipper

(57) ABSTRACT

The invention is a mill rod puller which removes mill rods from hammermills or similar devices through the use of a reciprocating hydraulic action. The rod puller includes a support frame and a rod extension that attaches to an end of the rods of the hammermill. The rod extension has a number of attachment points for attaching the rod extension to a reciprocating force generator. The reciprocating force generator then moves away from the hammermill, and pulls the rod extension with it, and also pulls the rod to which the rod extension is attached, in increments.

20 Claims, 8 Drawing Sheets

MILL ROD PULLER

BACKGROUND OF THE INVENTION

1. Field of the Invention

The present invention generally relates to rod pullers, and more particularly relates to hammermill rod pullers.

2. Background Information

A typical configuration of a hammermill is a large, rotating, cylindrical assembly, in which hammers, which are typically very heavy, are mounted to an assembly by one or more rods, which run the length of the cylinder and pass through holes. The hammers for some hammermills can weigh as much as 120 pounds each. The hammermill rotates at a rapid speed and material is fed toward the hammermill so that the hammers strike the material and break it into smaller pieces. Over time, the hammers must be replaced or repaired periodically because they become bent or worn. In order to remove the hammers of such a hammermill, one or more of the long, metal rods of the hammermill must be removed. These rods can typically be two to three inches in diameter. Since the hammers have performed work that causes them to strike heavy objects, the hammers themselves can be bent and the forces on the hammers can also cause the rods holding the hammers in place to be bent. This makes removing the rods very difficult and time consuming.

One method of removing the rods has been to use a drift pin and a sledgehammer to beat the rod out of the rotor of the hammermill. This involves a great deal of effort, is time consuming, and may result in damage to the end of the rod that is being pounded. Hydraulic means may also be utilized, but in such a case, the length of the piston stroke has been required to be at least equal to the length of the rod. This can be in excess of ten feet, and can be prohibitive in certain hammermill locations.

An additional consideration is that these hammermills are often mounted on a frame, and are transportable between jobsites. However, to be transportable, all of the components of the hammermill must be configured to be able to drive down the highway and not be a hazard to other vehicles or pedestrians. This is a problem with hydraulic rod pulling machines, since they can be quite long and unwieldy. A single stroke hydraulic rod puller is too long to transport, and must be dismounted and reassembled. For these reasons, it is an object of the invention to provide a mill rod puller that is made to a compact configuration, and which can, by the use of hydraulics, pull a mill rod from a hammermill. It is a further object of the invention to provide a mill rod puller that can remain mounted on the hammermill frame while it is configured for transportation.

Additional objects, advantages and novel features of the invention will be set forth in part in the description which follows and in part will become apparent to those skilled in the art upon examination of the following or may be learned by practice of the invention. The objects and advantages of the invention may be realized and attained by means of the instrumentalities and combinations particularly pointed out in the appended claims.

SUMMARY OF THE INVENTION

These and other objects are accomplished in the mill rod puller of the present invention. The mill rod puller of the present invention is a device for use with the grinding machine as described above. The grinding machine is mounted on a frame and is transportable between jobsites. The grinding machine includes a hammermill with hammers that are attached to the hammermill by one or more rods that extend through holes in the hammers. The rod puller of the present invention includes a support frame that connects to the grinding machine frame. The support frame may be configured to be removable from the grinding machine frame, and it may also be configured to swing to one side while the grinding machine is being transported.

The rod puller of the present invention includes a rod extension, which attaches to an end of the rods of the hammermill. The rod extension has a number of attachment points for attaching the rod extension to a reciprocating force generator. The rod extension attaches to one of the rods, and is then linked to the reciprocating force generator by a linkage piece. The reciprocating force generator then moves away from the hammermill, and pulls the rod extension with it, and also pulls the rod to which the rod extension is attached. The reciprocating force generator does not move the entire length of the mill rod, but moves one increment at a time. The linkage piece is removable, and may be repositioned to a different attachment point for each increment that the reciprocating force generator moves the rod extension and its attached rod.

The attachment points of the rod extension may be sections of rod that are of an enlarged diameter. These enlarged diameter rod sections can be disc like and integral with the rod extension. The linkage piece may be a key that engages one of the discs of the rod extension and links it with the reciprocating force generator. The key is typically a flattened disc that engages the rod extension and the reciprocating force generator.

The rod puller may also utilize holes in the rod extension, and engage with the reciprocating force generator by means of one or more pins that extend through the rod extension and connect to the reciprocating force generator.

The reciprocating force generator is typically a hydraulic based system, with a hydraulic pump, hoses, and hydraulic fluid. The hydraulic based reciprocating force generator includes a cylinder with a first and a second end, and a piston that can be powered to move towards either the first end or the second end of the cylinder. When the rod extension is linked to the piston via the linkage piece, the reciprocating force generator moves the rod extension and its attached rod away from or toward the hammermill, depending on how it is configured.

The hydraulic reciprocating force generator may also include an inner tube, which is a cylindrical member that extends through the cylinder of the reciprocating force generator. The inner tube is attached to the piston of the hydraulic cylinder and includes a slot through which the key may be inserted, thereby linking the rod extension and the reciprocating force generator. When connected to the rod extension, which in turn is connected to the rod, the reciprocating force generator can move the piston, and thereby move the rod extension and the rod from one end of the cylinder to another. When removing a mill rod, the piston would move from the first end of the cylinder to the second end of the cylinder. At that point, the link may be removed, and the piston may be moved to the opposite (first) end of the cylinder. When at the opposite (first) end of the cylinder, the link may be reinserted, thereby attaching the inner tube to a different attachment point on the rod extension. Once thus attached, the reciprocating force generator can be activated and move the piston from the first end of the cylinder to the second end of the cylinder once more. This process can be repeated until the rod is fully removed from, or fully inserted into the hammermill if performed in the opposite sequence.

Still other objects and advantages of the present invention will become readily apparent to those skilled in this art from the following detailed description wherein I have shown and described only the preferred embodiment of the invention, simply by way of illustration of the best mode contemplated by carrying out my invention. As will be realized, the invention is capable of modification in various obvious respects all without departing from the invention. Accordingly, the drawings and description of the preferred embodiment are to be regarded as illustrative in nature, and not as restrictive in nature.

DESCRIPTION OF THE PREFERRED EMBODIMENTS

Figure 1:
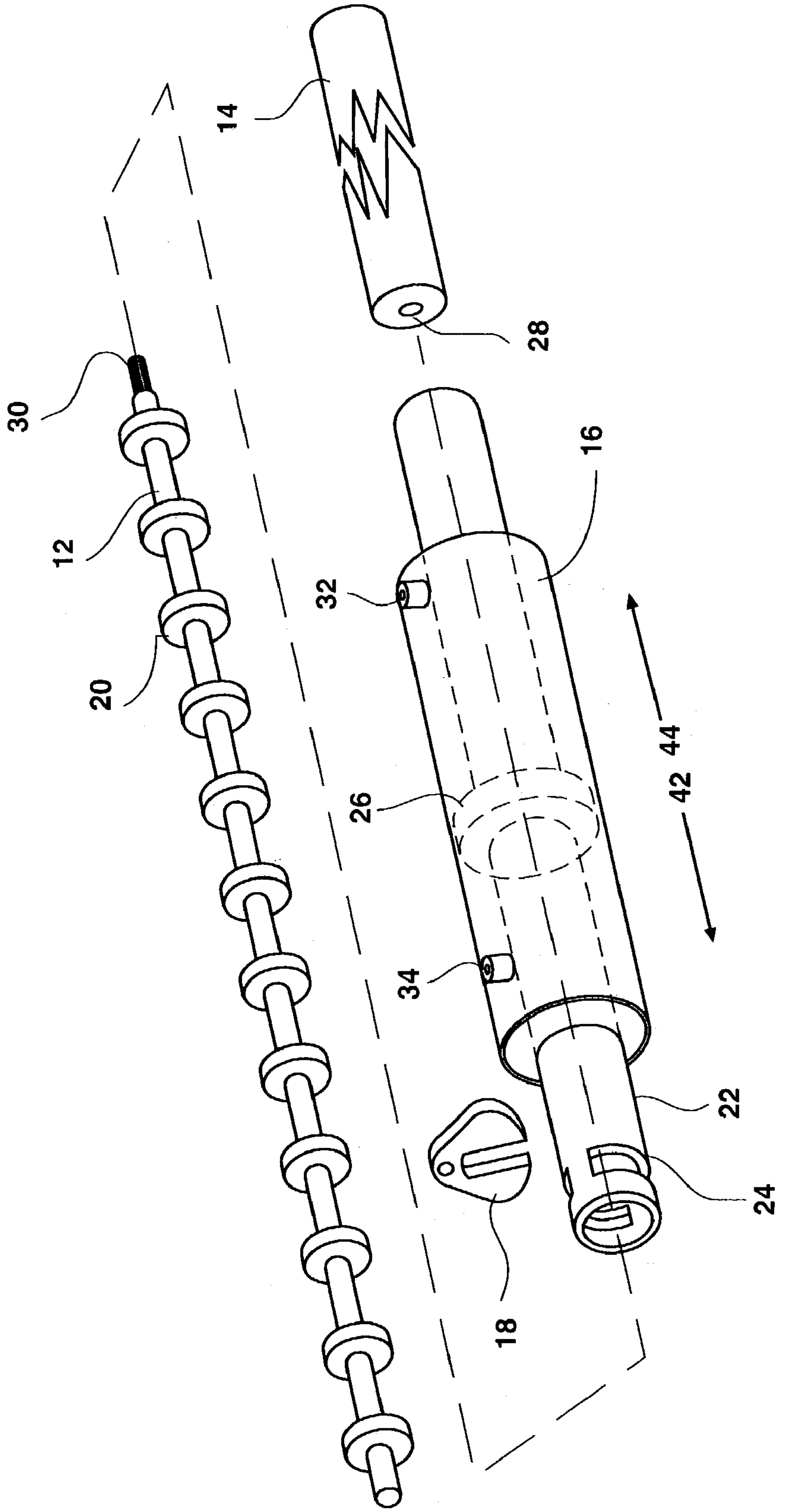
FIG. 1 is a perspective, exploded view of the hydraulic cylinder and rod extension of the invention.

While the invention is susceptible of various modifications and alternative constructions, certain illustrated embodiments thereof have been shown in the drawings and will be described below in detail. It should be understood, however, that there is no intention to limit the invention to the specific form disclosed, but, on the contrary, the invention is to cover all modifications, alternative constructions, and equivalents falling within the spirit and scope of the invention as defined in the claims.

Some preferred embodiments of the present invention are further shown in FIGS. 1–8. FIG. 1 shows one preferred embodiment of the present invention, which includes a rod extension 12, a hammermill rod 14, a hydraulic cylinder 16, an inner tube 22, and a piston 26. The rod extension 12 includes a number of discs 20, which are enlarged diameter portions of the rod. The rod extension 12 also includes a rod end bolt 30, which is configured for threading into a threaded bolt hole 28 on the end of the hammermill rod 14. The rod extension 12 passes through the inner tube 22 in order to connect with the end of the hammermill rod 14, as shown by the dotted line.

The hydraulic cylinder 16 includes a piston 26, which is attached to the inner tube 22. By applying pressurized hydraulic fluid to the first hydraulic connection 32 or the second hydraulic connection 34, the piston 26 can be made to move either in a first direction 42 or a second direction 44.

Figure 2:
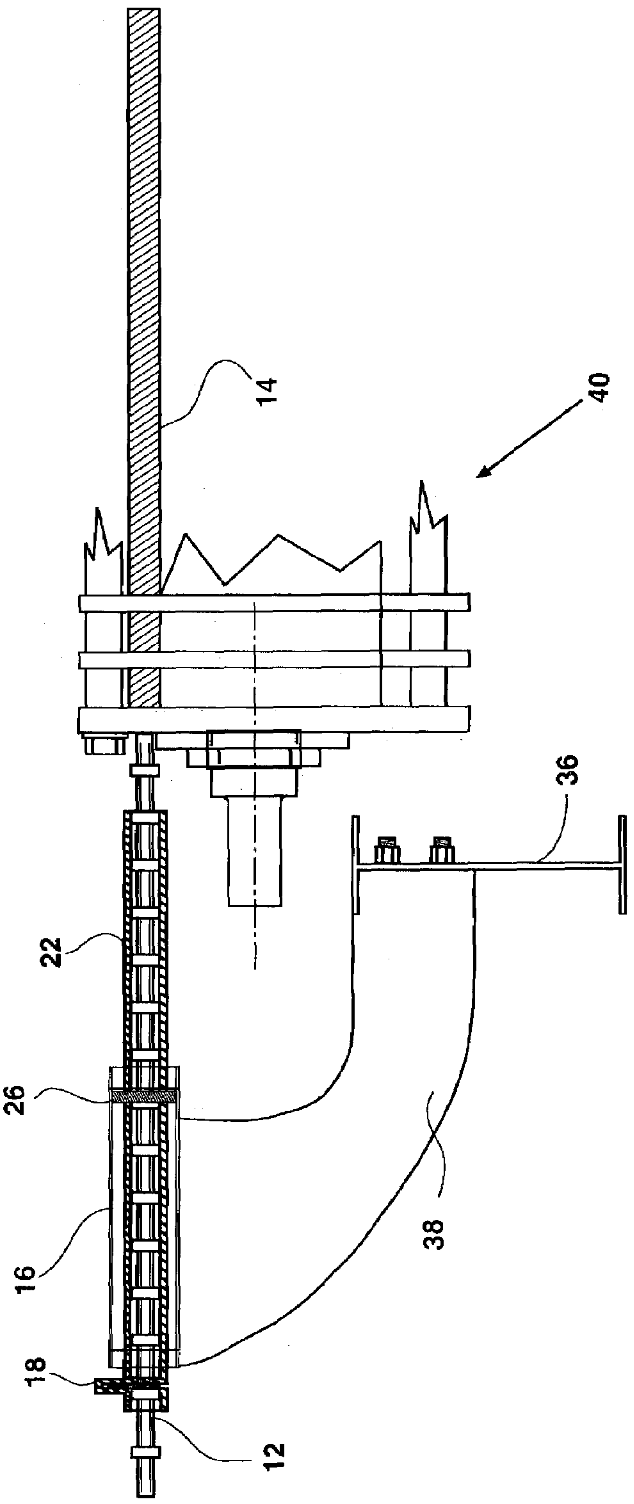
FIG. 2 is a side view of the invention assembled and mounted on a hammermill.
Figure 3:
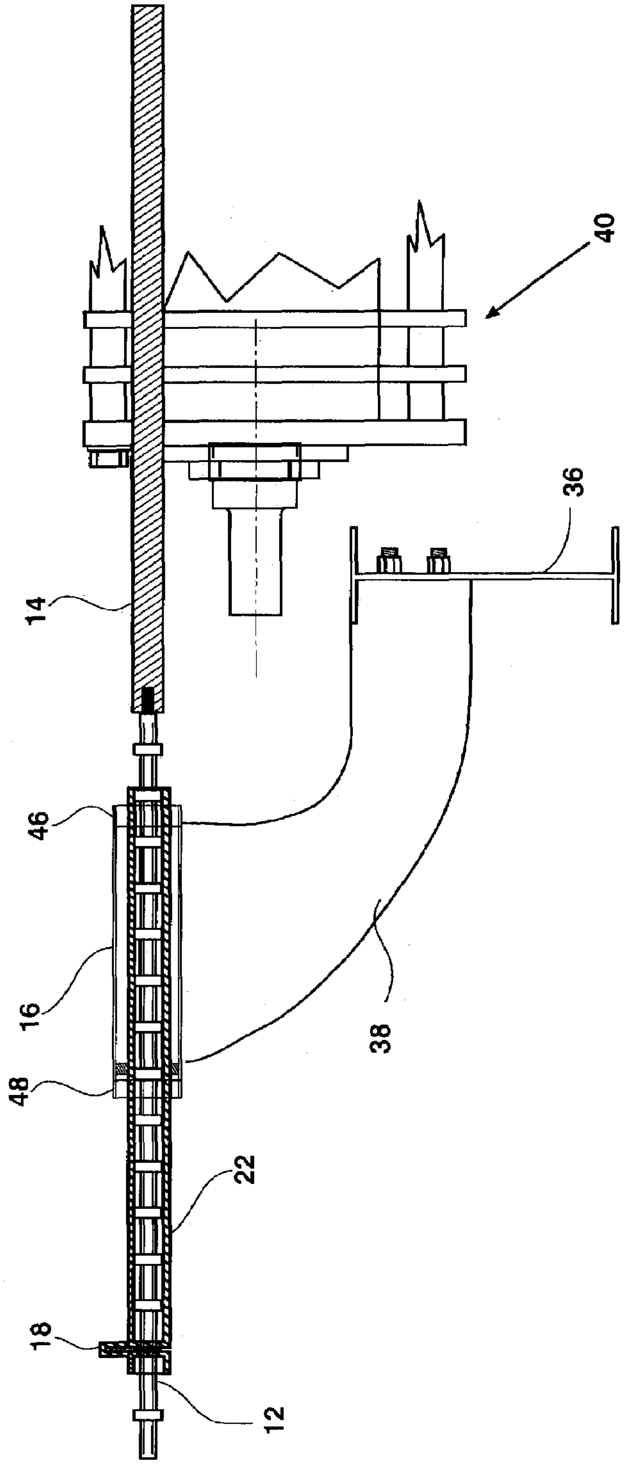
FIG. 3 is a side view of the device shown in FIG. 2, in which the piston has moved from one end of the cylinder to another.

FIG. 2 shows the components of FIG. 1 assembled into a position ready to extract a mill rod 14 from a hammermill 40. In this configuration, the rod extension 12 is attached to the end of the hammermill rod 14, and passes through the inner tube 22 of the hydraulic cylinder 16. The hydraulic cylinder 16 is supported by a rod puller frame 38, which is attached to the hammermill frame 36. The attachment of the rod puller frame 38 to the hammermill frame 36 can take several configurations. It can be solidly mounted as shown in FIG. 2, or it can be dismountable as shown in FIG. 3. It can also be configured to swing to one side so that it is parallel with the hammermill frame 36, as shown in FIG. 4.

FIG. 3 shows the next step in the process after attaching the rod extension 12, which is shown in FIG. 2. In FIG. 3, the piston 26 has traveled from a first end 46 of the hydraulic cylinder 16 to a second end 48 of the hydraulic cylinder 16. As the piston has made this travel, the inner tube 22 to which it is attached has traveled the same distance, pushing with it the rod extension 12 and pulling the rod 14 out of the hammermill by the same distance.

Figure 4:
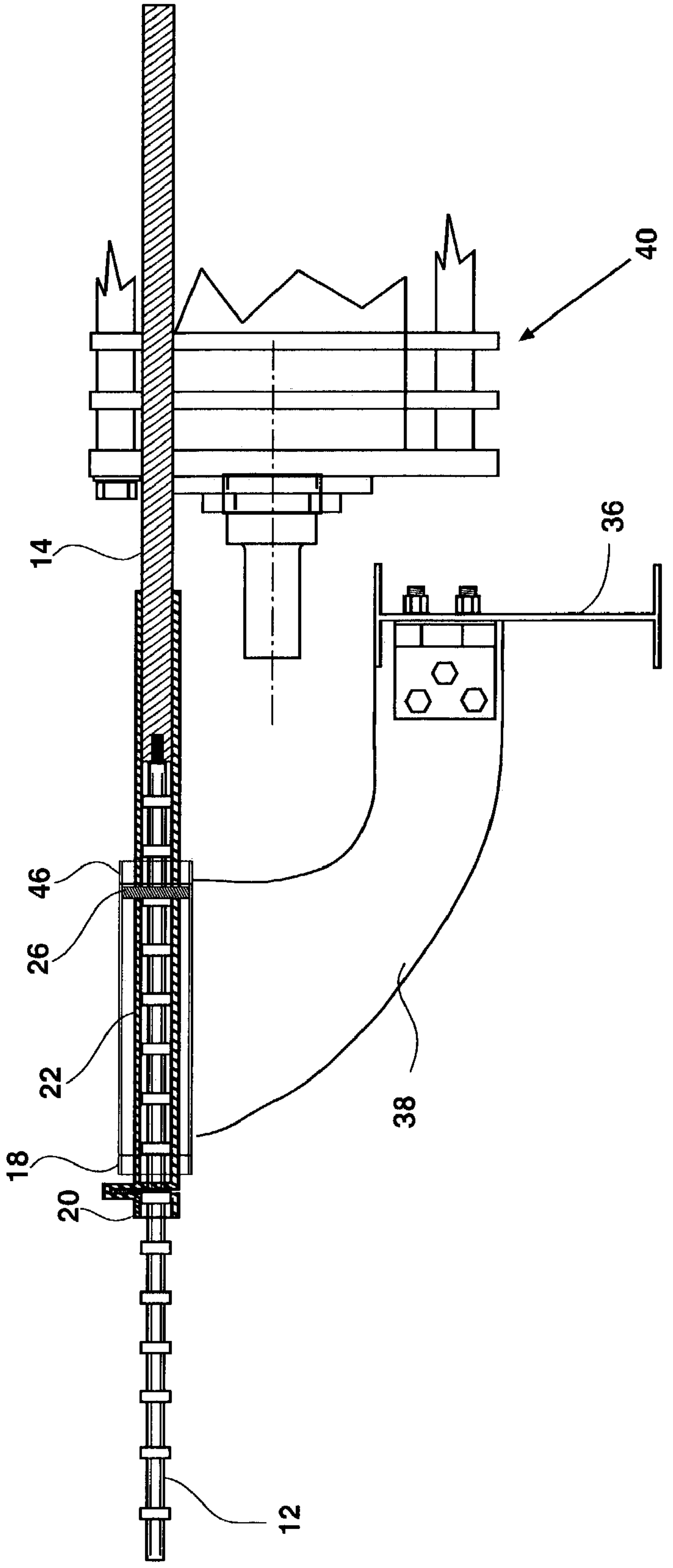
FIG. 4 is a side view of the invention in which the piston has moved to the first end of the cylinder and is ready to be linked with the rod extension.
Figure 5:
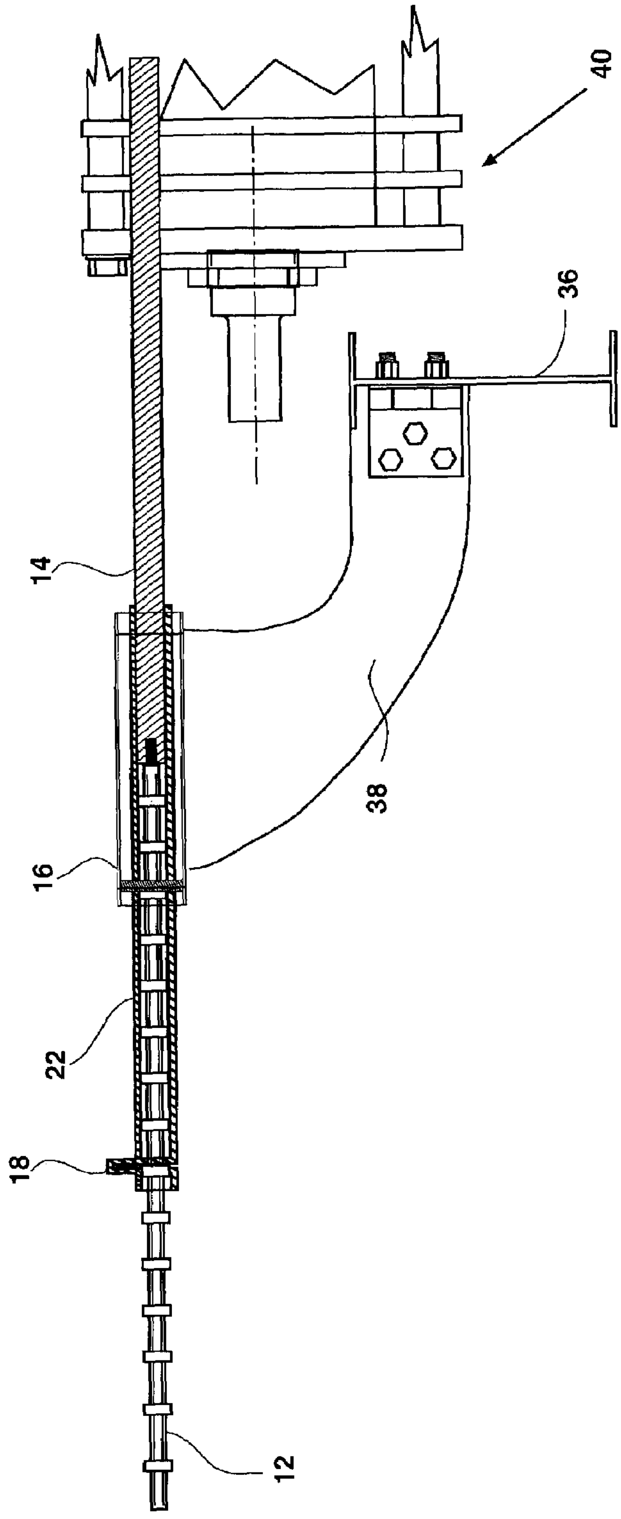
FIG. 5 shows the linkage shown in FIG. 4, in which the piston has been moved to the second end of the cylinder.

FIG. 4 shows the next step in the process in which the key 18 is removed from the rod extension 12, the piston 26 is moved to the first end 46 of the hydraulic cylinder 16, and the key 18 is reconnected through the key slot 24 of the inner tube 22 to a disc 20 of the rod extension 12. From this position, the piston 26 is again moved from the first end of the cylinder 46 to the second end 48 of the cylinder 16, which puts it in the position shown in FIG. 5. As can be seen, the mill rod 14 is thus withdrawn incrementally from the hammermill 40.

Figure 6:
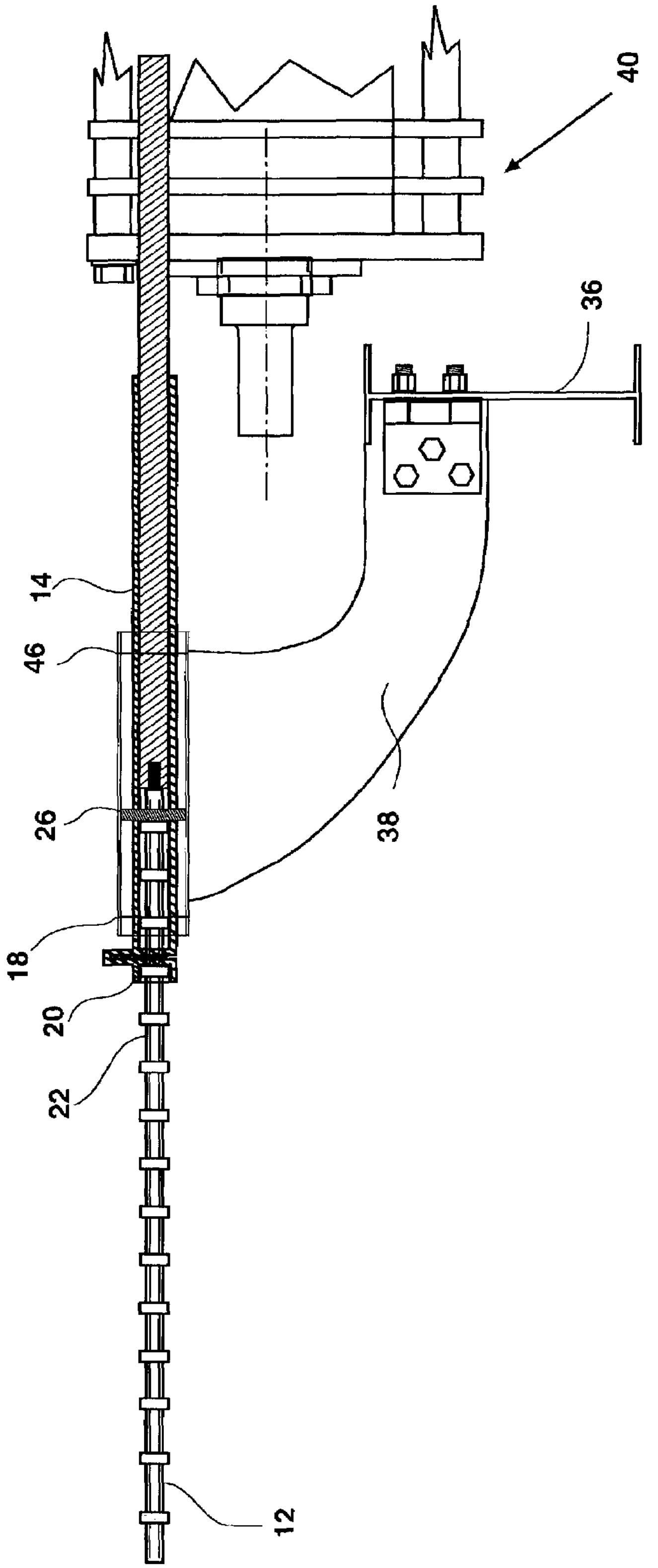
FIG. 6 is a side view of the device in which the piston has been moved to the first end of the cylinder and is ready to take a new connection to the rod extension.
Figure 7:
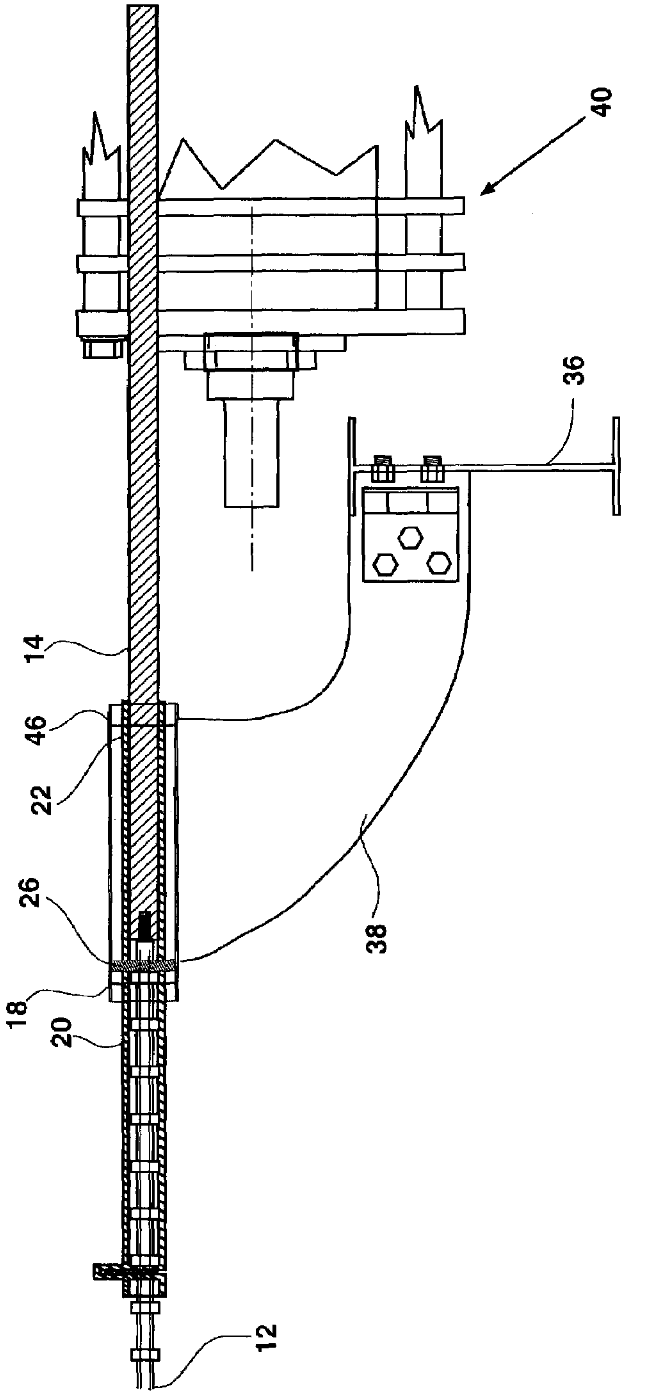
FIG. 7 is the configuration of FIG. 6, in which the piston has been moved to the second end of the cylinder.

FIGS. 6 and 7 show the next cycle of removing the mill rod 14 from the hammermill 40, which is repeated until the mill rod is fully removed from the hammermill 40.

The mill rod 14 can be inserted into the hammermill 40 by a reverse of this process.

Figure 8:
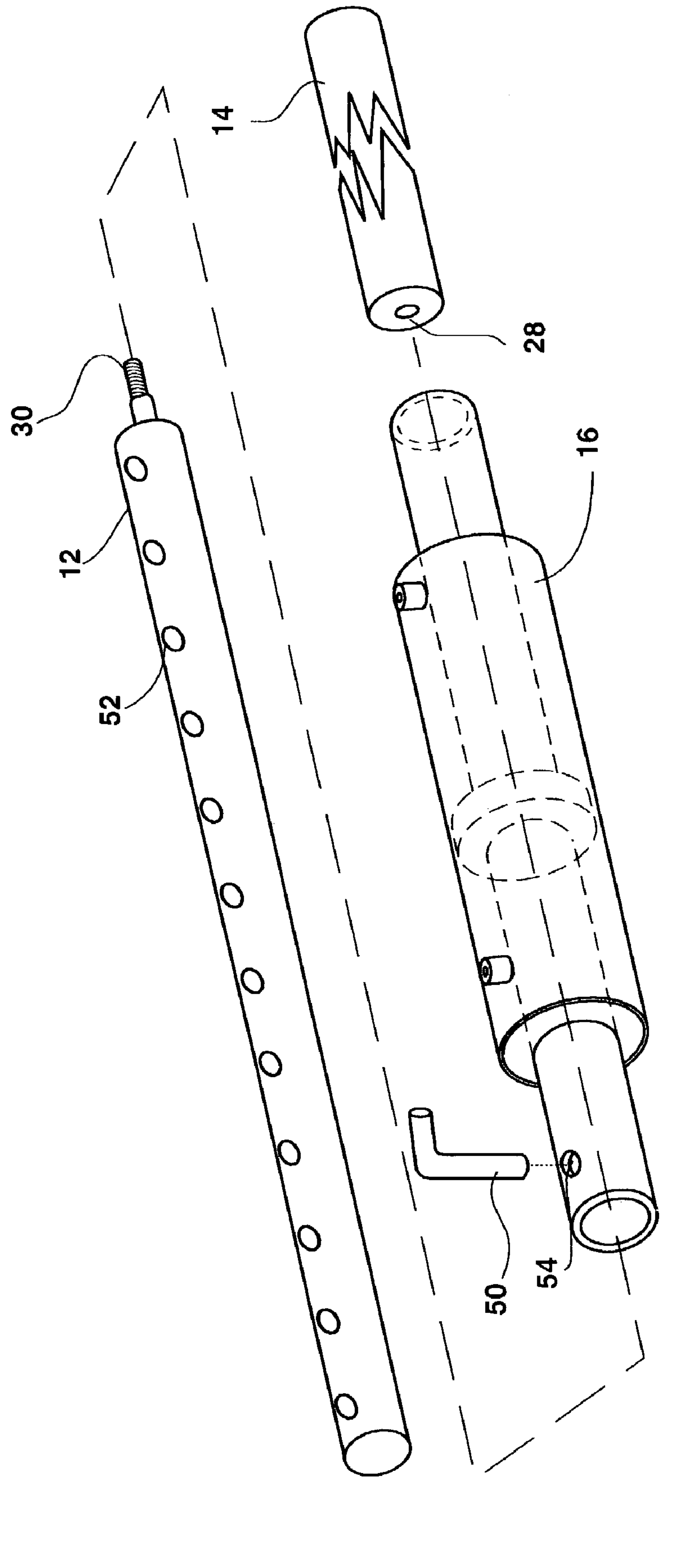
FIG. 8 is a perspective, exploded view of one configuration of the device.

FIG. 8 shows another embodiment of the present invention. In this embodiment of the invention, the linkage between the hydraulic cylinder 16 and the rod extension 12 is a link pin 50. In this embodiment of the present invention, rather than have the discs 20 of the previous embodiment, there are provided pinholes 52 on the rod extension 12, and a corresponding tube hole 54 through which the link pin 50 may extend and pass through a selected pinhole 52 in the rod extension 12.

While there is shown and described the present preferred embodiment of the invention, it is to be distinctly understood that this invention is not limited thereto but may be variously embodied to practice within the scope of the following claims. From the foregoing description, it will be apparent that various changes may be made without departing from the spirit and scope of the invention as defined by the following claims.

I claim:

1. A mill rod puller for a use with a grinding machine which is mounted on a frame, and which includes a hammermill with hammers attached to said hammermill by a number of rods which extend through said hammers, comprising:

- a rod puller support frame which connects to said grinding machine frame;
- a rod extension for attachment to an end of one of said rods for pulling said rod from said hammermill, said rod extension with a plurality of attachment points for connection to a reciprocating force generator, in which said attachment points of said rod extension are enlarged diameter sections of said rod extension, for incrementally moving said rod extension toward or away from said hammermill by reciprocating action, with said rod attached to said rod extension; and
- a linkage piece for linking said rod extension to said reciprocating force generator, in which said linkage piece is configured to be repositionable to a different attachment point for each increment of rod movement.

2. The rod puller of claim 1 in which said rod extension linkage piece is a key which is configured for engagement with one of said enlarged diameter sections of said rod extension, where said engagement connects said rod extension with said reciprocating force generator.

3. The rod puller of claim 2 in which said key is a generally flattened disc which engages said rod extension and said reciprocating force generator.

4. The rod puller of claim 1 in which said reciprocating force generator is a hydraulic based system.

5. The rod puller of claim 4 in which said reciprocating force generator includes a cylinder with a first end and a second end, and a piston which can be powered to move in a first direction and a second direction, and by attachment to said rod extension via said linkage piece, move the rod extension in a first direction or in a second direction, away from or toward said hammermill.

6. The rod puller of claim 5 which further includes an inner tube which is attached to said piston and is removably attachable to said rod extension, and which surrounds said rod extension.

7. The rod puller of claim 6 in which said inner tube defines a key slot in which said key may be inserted, by which said rod extension can be linked to said reciprocating force generator.

8. The rod puller of claim 5 in which a distance of piston travel in said cylinder is an increment that a rod is pushed or pulled.

9. The rod puller of claim 1 in which said support frame is configured to dismount from said grinding machine frame.

10. The rod puller of claim 1 in which said support frame is configured to move from a maintenance position to a travel position, with said travel position providing decreased width for easier road passage.

11. The rod puller of claim 10 in which said support frame is configured to swing between said travel position to said maintenance position and back again, and to lock in place in either position.

12. A rod puller for a use with a grinding machine which is mounted on a frame, and which includes a hammermill with hammers attached to said hammermill by a number of rods that extend through said hammers, comprising:

a support frame which connects to said grinding machine frame;

a rod extension for attachment to an end of one of said rods for pulling said rod from said hammermill, said rod extension with a plurality of attachment points for connection to a hydraulic based reciprocating force generator, said reciprocating force generator comprising a cylinder with a first end and a second end, and a piston that can be powered to move in a first direction and a second direction, and by attachment to said rod extension via said linkage piece, move the rod extension in a first direction or in a second direction, away from or toward said hammermill for incrementally moving said rod extension toward or away from said hammermill by reciprocating action, with said rod attached to said rod extension;

an inner tube which is attached to said piston and is removably attachable to said rod extension, and which surrounds said rod extension and with said inner tube defining a key slot in which said key may be inserted, by which said rod extension can be linked to said reciprocating force generator; and a linkage piece for linking said rod extension to said reciprocating force generator, in which said linkage piece is configured to be repositionable to a different attachment point for each increment of rod movement.

13. A rod puller for a use with a grinding machine which is mounted on a frame and which includes a hammermill with hammers attached to said hammermill by a number of rods which extend through said hammers, comprising:

a rod puller support frame which connects to said grinding machine frame, with said support frame configured to move from a maintenance position to a travel position, with said travel position providing decreased width for easier road passage and to lock in place;

a rod extension for attachment to an end of one of said rods for pulling said rod from said hammermill, said rod extension with a plurality of attachment points for connection to a reciprocating force generator, for incrementally moving said rod extension toward or away from said hammermill by reciprocating action, with said rod attached to said rod extension; and a linkage piece for linking said rod extension to said reciprocating force generator, in which said linkage piece is configured to be repositionable to a different attachment point for each increment of rod movement.

14. A rod puller for a use with a grinding machine which is mounted on a frame, and which includes a hammermill with hammers attached to said hammermill by a number of rods which extend through said hammers, comprising:

a support frame which connects to said grinding machine frame and is configured to swing between said travel position to said maintenance position and back again, and to lock in place in either position;

a rod extension for attachment to an end of one of said rods for pulling said rod from said hammermill, said rod extension with a plurality of attachment points for connection to a hydraulic based reciprocating force generator, said reciprocating force generator including a cylinder with a first end and a second end, and a piston which can be powered to move in a first direction and a second direction, and by attachment to said rod extension via said linkage piece, to move the rod extension in a first direction or in a second direction, away from or toward said hammermill by reciprocating action, with said rod attached to said rod extension, with said piston traveling in said cylinder a selected distance, which is the increment of rod movement; and a linkage piece for linking said rod extension to said reciprocating force generator, in which said linkage piece is configured to be repositionable to a different attachment point for each increment of rod movement.

15. A mill rod puller for a use with a grinding machine which is mounted on a frame, and which includes a hammermill with hammers attached to said hammermill by a number of rods which extend through said hammers, comprising:

a rod puller support frame which connects to said grinding machine frame;

a rod extension for attachment to an end of one of said rods for pulling said rod from said hammermill, said rod extension with a plurality of attachment points for connection to a reciprocating force generator, with said attachment points in the form of holes in said rod extension, with engagement with said reciprocating force generator by means of a link pin that goes through said rod extension and said force generator, for incrementally moving said rod extension toward or away from said hammermill by reciprocating action, with said rod attached to said rod extension; and said link pin for linking said rod extension to said reciprocating force generator, in which said link pin is configured to be repositionable to a different attachment point for each increment of rod movement.

16. The mill rod puller of claim 15 in which said reciprocating force generator is a hydraulic based system.

17. The mill rod puller of claim 16 in which said reciprocating force generator includes a cylinder with a first end and a second end, and a piston which can be powered to move in a first direction and a second direction, and by attachment to said rod extension via said linkage piece, move the rod extension in a first direction or in a second direction, away from or toward said hammermill.

18. The mill rod puller of claim 17 which further includes an inner tube which is attached to said piston and is removably attachable to said rod extension, and which surrounds said rod extension.

19. The mill rod puller of claim 18 in which said inner tube defines a key slot in which said key may be inserted, by which said rod extension can be linked to said reciprocating force generator.

20. The mill rod puller of claim 5 in which a distance of piston travel in said cylinder is an increment that a rod is pushed or pulled.

* * * * *